Oct. 8, 1940.  A. J. G. GIBBS  2,217,270
PRODUCTION OF COLORED OR PICTORIAL DESIGNS
Filed Nov. 28, 1939

INVENTOR
A. J. G. GIBBS
PER
ATTORNEYS

Patented Oct. 8, 1940

2,217,270

UNITED STATES PATENT OFFICE 2,217,270

PRODUCTION OF COLORED OR PICTORIAL DESIGNS

Alec John Galbraith Gibbs, Luton, England

Application November 28, 1939, Serial No. 306,525
In Great Britain August 21, 1939

2 Claims. (Cl. 35—26)

This invention relates to the production of pictorial designs and is primarily intended for educational and amusement purposes so that a knowledge of colorings of flowers and other articles or the balance and distribution of colors can be readily acquired by children and others. The chief object of the invention is to provide apparatus by means of which this desideratum can be achieved in a fascinating and convenient manner. Another object of this invention is to provide means suitable for entertaining or educating children in which flowers and other printed representations can be colored in a fairly accurate manner without the disadvantage of loose crayons and paints.

According to this invention means for producing colored pictorial designs comprises a card or the like with a printed outline of an article or picture marked in sections each adapted to receive a distinctive color, and transparent sheet material bearing a number of transferable colored sections shaped to correspond and register with predetermined sections or areas of the said outline and adapted to be transferred individually to the appropriate sections of the printed outlines by rubbing the back of the transparent sheet.

In order that this invention may be clearly understood and readily carried into effect a sheet of drawings is appended hereto illustrating one embodiment thereof and wherein—

Figure 1:
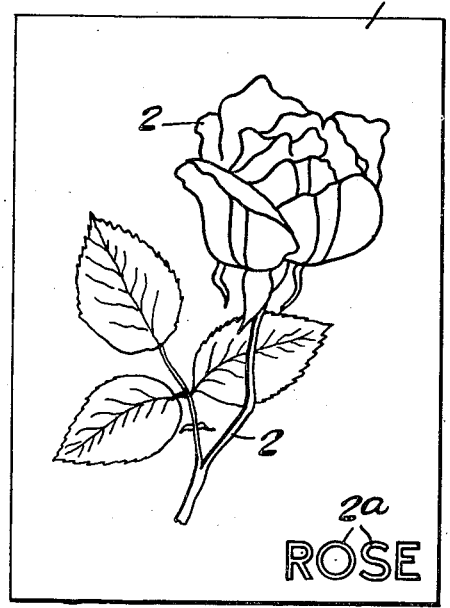
Fig. 1 is a face view of a non-colored sheet with a printed outline of a flower thereon.
Figure 2:
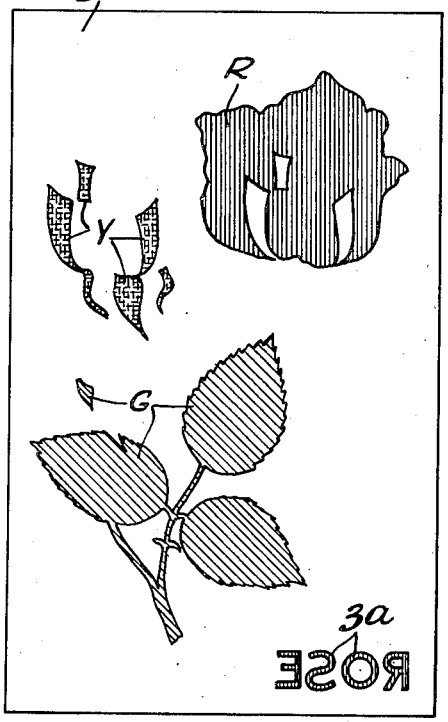
Fig. 2 is a face view of a colored transparent sheet with various colored sections thereon appropriate to a complete picture and adapted to be transferred to predetermined sections of the non-colored picture on the sheet shown in Fig. 1.
Figure 3:
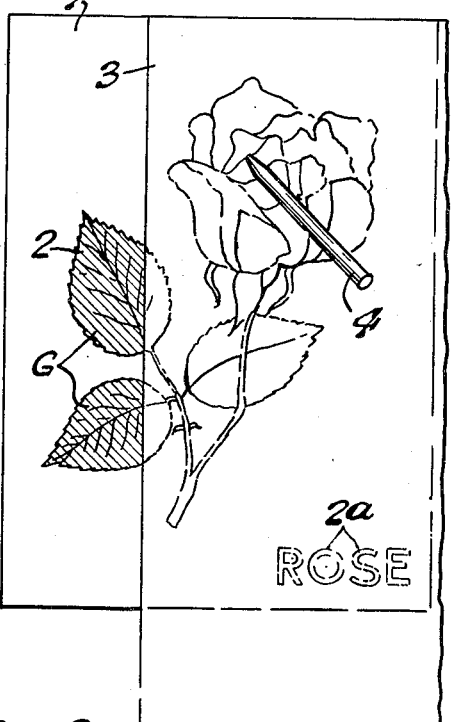
Fig. 3 is a view showing how the coloring is transferred to the non-colored sheet.

Referring to the drawing a number of base cards either loose or in book form have printed thereon preferably by black lines outlines of flowers or other colored objects. One of these cards is shown in Fig. 1 in which the card 1 bears an outline 2 of a rose printed preferably in black lines. These outlines are not colored, but a number of transparent or semitransparent sheets of paper or other suitable sheet material corresponding to the number of base cards 1 are provided, one being shown in Fig. 2 and on one side of each transparent or semi-transparent sheet 3 is applied carbon ink. The carbon ink is applied to each sheet 3 in sections which go to make up a complete picture and correspond to predetermined sections on the printed outline. These sections are colored red, green and yellow as indicated by the letters R, G and Y and the conventional shade lines. By placing the transparent sheet 3 with the carbon ink downwards upon the card 1 on which is printed the complete outline of a flower or other object, the desired section of the non-colored sheet can have color applied to it by rubbing the back of the carbon ink bearing sheet. That is to say, various colors can be accurately applied to a printed non-colored sheet by a transfer method involving rubbing. This is shown by way of example by reference to Fig. 3 in which it is seen that the foliage of the picture has already been colored as at G.

Any suitable available implement 4 may be used for effecting the rubbing provided it has a smooth yet hard and preferably narrow edge. The sheet 3 must not be permitted to move whilst the rubbing process is being effected but must be held firmly down by hand or by drawing pins or other convenient method.

Figure 4:
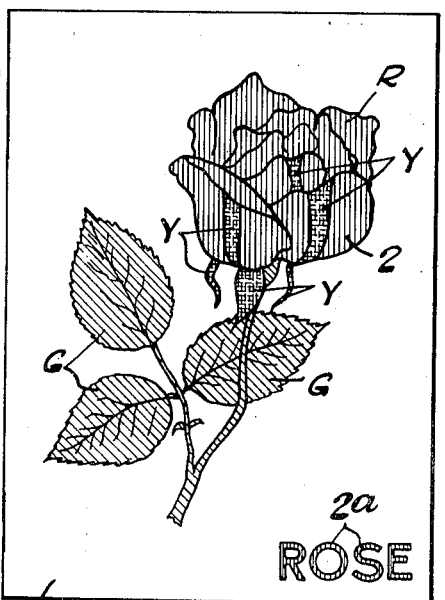
Fig. 4 is a face view of the sheet shown in Fig. 1 and now bearing a complete coloring.

Each transparent sheet 3 preferably has a complete set of colors thereon, e. g., green colored sections to represena leaves of foliage, and one or more other colored sections adapted to make up a complete flower, it being understood that each colored section is applied separately or together. The completed picture is shown in Fig. 4.

By means of the present invention children and others are readily educated in the composition and shape of flowers and other articles and also in the proper form of coloring thereof. Added attraction is obtained by printing on the appropriate face of each transparent sheet in a suitable color the name of the flower or other article as shown at 3a, and it is preferred also to print the outline of the name in black on the non-colored sheet as at 2a so that the name can be transferred in color from the transparent sheet to the non-transparent sheet.

Instead of each colored section on a transparent sheet being a separate entity involving a number of transfer operations corresponding to the number of different colors, some or all of the colors on each transparent sheet 3 can be combined in the same relationship which they should ultimately occupy when transferred to the non-colored sheet 1.

I claim:

1. Means for producing colored pictorial designs comprising a card or the like with a printed outline of an article or picture marked in sections each adapted to receive a distinctive color, and transparent sheet material bearing a number of transferable colored sections shaped to correspond and register with predetermined sections or areas of the said outline and adapted to be transferred individually to the appropriate sections of the printed outlines by rubbing the back of the transparent sheet.

2. As an article of manufacture the combination of a thin sheet of transparent paper or the like and a base sheet, said transparent sheet having on one face thereof separated sections of pictorial matter each distinctively colored all over with transferable carbon adapted to be transferred to the base sheet, said base sheet bearing a printed outline of a complete picture composed of distinctive sections corresponding to the shape of the said colored sections.

ALEC JOHN GALBRAITH GIBBS.